(12) United States Patent
Haradinaj

(10) Patent No.: US 12,083,842 B2
(45) Date of Patent: Sep. 10, 2024

(54) ARRANGEMENT FOR SECURING A VIBRATION DAMPER OF A VEHICLE

(71) Applicant: Bayerische Motoren Werke Aktiengesellschaft, Munich (DE)

(72) Inventor: Mehdi Haradinaj, Windach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 526 days.

(21) Appl. No.: 17/413,070

(22) PCT Filed: Dec. 13, 2019

(86) PCT No.: PCT/EP2019/085112
§ 371 (c)(1),
(2) Date: Jun. 11, 2021

(87) PCT Pub. No.: WO2020/120752
PCT Pub. Date: Jun. 18, 2020

(65) Prior Publication Data
US 2022/0024270 A1  Jan. 27, 2022

(30) Foreign Application Priority Data
Dec. 14, 2018  (DE) .................... 10 2018 132 304.2

(51) Int. Cl.
*F16F 9/54* (2006.01)
*B60G 13/00* (2006.01)
*F16F 1/376* (2006.01)

(52) U.S. Cl.
CPC ......... *B60G 13/003* (2013.01); *B60G 13/005* (2013.01); *F16F 9/54* (2013.01);
(Continued)

(58) Field of Classification Search
CPC .......... F16F 9/54; F16F 1/376; B60G 13/003; B60G 13/005
(Continued)

(56) References Cited

U.S. PATENT DOCUMENTS 3,409,489 A * 11/1968 Renton .................. F16F 1/376
416/214 R
5,634,757 A  6/1997 Schanz
(Continued)

FOREIGN PATENT DOCUMENTS

CN  1129162 A  8/1996
CN  102133708 A  7/2011
(Continued)

OTHER PUBLICATIONS

Machine translation, WO 2014/056700 A2. (Year: 2014).*
(Continued)

*Primary Examiner* — Thomas J Williams
(74) *Attorney, Agent, or Firm* — Crowell & Moring LLP

(57) ABSTRACT

An arrangement for securing a vehicle vibration damper on a wheel support and/or on a vehicle body includes a rubber bearing secured by a fastener, the rubber bearing including at least two rubber bushings. When in an installed position, at least one of the rubber bushings is secured in three longitudinal degrees of freedom relative to the wheel support or the vehicle body, and a rotational degree of freedom of the one of the bushings about the axis of the fastener is blocked by a form-fitting arrangement. The form-fitting arrangement formed by engagement of a nose on the one of the bushings into a recess arranged in a rubber bearing receiving area of the wheel support and/or vehicle body. The nose and the recess are shaped such that the form fitting connection is formed only by installing the fastener, without the need for manually rotating the bushing with a tool.

8 Claims, 3 Drawing Sheets

(52) U.S. Cl.
CPC .. *B60G 2204/128* (2013.01); *B60G 2204/129* (2013.01); *B60G 2204/41* (2013.01); *B60G 2204/4404* (2013.01); *B60G 2206/8111* (2013.01); *F16F 1/376* (2013.01)

(58) Field of Classification Search
USPC .................. 267/140.3, 141, 141.2; 384/220
See application file for complete search history.

(56) References Cited

U.S. PATENT DOCUMENTS

| | | | | |
|---|---|---|---|---|
| 8,789,820 | B2 * | 7/2014 | Yu | F16F 9/58 384/220 |
| 2008/0163453 | A1 * | 7/2008 | Joseph | F16F 1/373 16/2.1 |

FOREIGN PATENT DOCUMENTS

| | | | | |
|---|---|---|---|---|
| CN | 104413536 A | 3/2015 | | |
| CN | 205469580 U | 8/2016 | | |
| CN | 206153902 U | 5/2017 | | |
| CN | 108679169 A | 10/2018 | | |
| DE | 103 27 556 A1 | 1/2005 | | |
| DE | 10 2012 218 458 A1 | 6/2014 | | |
| DE | 10 2015 210 151 A1 | 12/2016 | | |
| DE | 102018125459 A1 * | 4/2020 | ........... | B60G 13/003 |
| EP | 0363283 B1 * | 12/1993 | .............. | F16L 37/12 |
| KR | 19980040030 U * | 9/1998 | ......... | B60G 2204/41 |
| KR | 19990059903 A * | 7/1999 | ......... | B60G 2204/41 |
| RU | 2 044 184 C1 | 9/1995 | | |
| WO | WO 2014/056700 A2 | 4/2014 | | |

OTHER PUBLICATIONS

Chinese-language Office Action issued in Chinese Application No. 201980080333.0 dated May 5, 2023 with English translation (16 pages).

International Search Report (PCT/ISA/210) issued in PCT Application No. PCT/EP2019/085112 dated Apr. 6, 2020 with English translation (four (4) pages).

German-language Written Opinion (PCT/ISA/237) issued in PCT Application No. PCT/EP2019/085112 dated Apr. 6, 2020 (seven (7) pages).

* cited by examiner

ARRANGEMENT FOR SECURING A VIBRATION DAMPER OF A VEHICLE

BACKGROUND AND SUMMARY OF THE INVENTION

The invention relates to a fastening arrangement for a vehicle vibration damper. With regard to the prior art, reference is made by way of example to DE 10 2012 218 458 A1.

During the course of the production of a motor vehicle, in particular a passenger motor vehicle, it is normally the case that the components of the chassis are pre-assembled, specifically on a so-called axle carrier which is joined to the vehicle body at a later stage, this being commonly referred to as "marriage". In the non-joined state of the pre-assembled chassis, the supporting springs, on which the vehicle body (=body shell) bears in the joined state, are completely relieved of load. After the assembly of the vehicle body and the axle carrier, when the vehicle is set down on the floor after said marriage and possibly further assembly steps, which are carried out at the vehicle, which is suspended from a conveying installation, the supporting springs are loaded with the weight of the body shell and consequently compressed by a certain amount. This normally applies correspondingly to the vibration dampers (also referred to hereinafter merely as "dampers"), which are connected in parallel with the supporting springs in terms of function and are consequently usually moved from a greatly extended state into a partially retracted state in the vicinity of the center position.

After the vehicle body and the pre-assembled axle carrier with wheel carriers fastened thereto are joined together and after the just-mentioned change in the state of the supporting springs and normally also the dampers that is realized when the completed vehicle is set down on its wheels for the first time, the wheel carriers are as it were transferred from a relatively greatly extended position at least approximately into their so-called construction position. The latter, that is to say the "target height", is known to be assumed by them only if the vehicle body is as it were loaded in a standardized manner by given additional weights, such as a filled fuel tank and an occupant.

In the case of such changes in the height of the wheel carrier in relation to the vehicle body, it is known that the position of the wheel carrier, which is describable by way of camber angle, toe angle and castor angle, is changed. This leads, at a damper fastened via a rubber bearing using a screw or the like to a wheel carrier and/or to the vehicle body, to said rubber bearing being transferred from a state of substantially no stress during assembly with unloaded supporting springs into a slightly stressed state when the supporting springs are or have been loaded with the weight of the vehicle body. An elastomer element provided between the two bushings of the stated and, with regard to its/their basic construction, conventional rubber bearing(s) is thus already slightly stressed or subjected to stress loading in the stated construction position, which can have an adverse effect on the driving comfort of the vehicle.

DE 10 2012 218 458 A1 presents a remedial measure for the stated problem. Here, provision is made of a fastening arrangement for fastening a vibration damper to a wheel carrier and/or to the body of a vehicle via a rubber bearing by means of a screw or the like, by way of which screw one of the two bushings of the rubber bearing is fixed in the three longitudinal degrees of freedom in relation to the wheel carrier or to the vehicle body. Here, provision is made at the rubber bearing bushing and at the wheel carrier and/or at the vehicle body of a measure by way of which the rotational degree of freedom of the rubber bearing bushing about the axis of the screw is blocked by a form fit. Such a form fit is formed in DE 10 2012 218 458 A1, for example, via a feather key element between a spherical segment-shaped end section of the rubber bearing bushing and a likewise spherical segment-shaped cutout of the wheel carrier. It is furthermore proposed to form the form fit via a suitable shape, not rotationally symmetrical with respect to the screw, of the mutually facing spherical segment-shaped bearing surfaces of the rubber bearing bushing and of the wheel carrier. Such a shape may for example be a square, hexagon or dihedron. Furthermore, small noses projecting from the rubber bearing bushing and able to latch into cutouts, provided therefor, in the wheel carrier are proposed.

Although the form-fitting blockage results in the formation of a form fit between the spherical segments and thus blockage of the rotational degree of freedom of the inner bushing of the rubber bearing with respect to the axis of the screw, it is still necessary to realize a manual prestressing process, during which the rubber bearing bushing is rotated into the spherical segment shape of the wheel carrier and in this way is prestressed. For this purpose, special prestressing tools are required. Furthermore, an additional manufacturing step consequently arises. This necessitates additional outlay and costs.

It is thus an object of the invention to present a fastening arrangement for fastening a vibration damper of a vehicle to a wheel carrier and/or to a vehicle body that optimizes or improves the expensive and time-consuming manual prestressing process.

The object is achieved by a fastening arrangement for fastening a vibration damper of a vehicle to a wheel carrier and/or to a vehicle body and by a method for producing such a fastening arrangement.

Said object is achieved by a fastening arrangement for fastening a vibration damper, in particular a damper/supporting spring unit, to a wheel carrier and/or to the vehicle body (=body of a vehicle or else referred to as body shell) via a rubber bearing by means of a screw or the like, by way of which one of the two bushings of the rubber bearing is fixed in the or its three longitudinal degrees of freedom in relation to the wheel carrier. Here, provision is made at said rubber bearing bushing and at the wheel carrier and/or at the vehicle body of a measure by way of which the rotational degree of freedom of said rubber bearing bushing about the axis of the screw is blocked by a form fit.

Here, it is furthermore provided that the stated form-fitting blockage is formed by an interengagement of a cutout, which is arranged in a receiving part of the wheel carrier for receiving the rubber bearing, with a nose, which is arranged on the rubber bearing bushing and projects from the rubber bearing bushing.

It is furthermore provided here that the nose and the cutout are shaped in such a way that the form fit between the nose and the cutout has been or is formed only by screwing the screw into the cutout of the wheel carrier, without manual rotation of the rubber bearing bushing. In other words, the nose and the stated cutout in the receiving part of the wheel carrier are shaped in such a way that solely through advancement or solely through translational movement (along the screw axis) of the rubber bearing bushing in the direction of the wheel carrier (or in the direction of the vehicle body) does the nose slide into the cutout and is the form fit thus formed. A manual rotation known from the prior art of the rubber bearing bushing such that the nose slides into the cutout is no longer necessary here. Consequently, a manufacturing step can advantageously be saved.

It is preferably the case here that said form-fitting blockage is arranged or formed such that, when the vibration damper is mounted on the wheel carrier or on the vehicle body, without loading of the wheel carrier by way of the vehicle body, for exact bracing or fixing by the screw or the like, the vibration damper is positioned in relation to the wheel carrier and/or to the vehicle body in such a way that the rubber bearing, more precisely an elastomer element of the rubber bearing, is, in the construction position, that is to say with standard loading of the wheel carrier by the vehicle body, at any rate with respect to the stated rotational degree of freedom, at least approximately free of stress or is set into a defined state of stress.

It is provided here that the damper is mounted in a defined location or position on the wheel carrier and/or on the vehicle body via the rubber bearing, which, as already stated, normally has an external outer bushing, connected substantially rigidly to the damper housing, and an internal inner bushing, connected substantially rigidly via said screw or the like to the wheel carrier and/or to the vehicle body, and an annular elastomer element between these two bushings.

Preferably, this location or position of the damper and thus also of the rubber bearing, with the stated bushings thereof and the elastomer element situated therebetween, is defined or fixed in such a way that the elastomer element of the rubber bearing is, as viewed in the direction of rotation about the axis of rotation of the screw which fixes the rubber bearing, slightly internally stressed when, during the course of the aforementioned "marriage", that is to say the joining-together of the vehicle body and the pre-assembled axle carrier, the damper is or has been fastened at its two ends fixedly to the vehicle body at one side and to the wheel carrier at the other side, without the wheel carrier being proportionately loaded by the weight of the vehicle body. This stress in the elastomer element applied with the fixing of the damper position in relation to the vehicle body and to the wheel carrier without loading of the wheel carrier by way of the vehicle body is, by way of said defined assembly position, selected or fixed in such a way that said stress is reduced at least approximately automatically when the wheel carrier is loaded proportionately, that is to say with its proportion (this being approximately 25% in the case of a conventional passenger motor vehicle), by way of the vehicle body and thus assumes its construction position in relation to the vehicle body.

During the fastening or mounting of the damper between the vehicle body and the wheel carrier, a stress is consequently built up without loading of the supporting spring assigned to the damper in the associated damper rubber bearing, which stress is reduced automatically at a later stage by way of standard loading of the supporting spring, by way of which the wheel carrier assumes or passes into its construction position in relation to the vehicle body.

Although it is in theory basically possible even without a blockage by form-fitting for a vibration damper fastened via a rubber bearing to a wheel carrier and/or to the vehicle body to be mounted fixedly on the wheel carrier and/or the vehicle body in such a defined position that, during the mounting of the vibration dampers between the wheel carriers and the vehicle body, with unloaded supporting springs, a desired prestress in the elastomer elements of the damper rubber bearings is generated, the actual generation of the desired prestress in said respective elastomer element without loading of the associated supporting spring during the mounting of the damper is reliably ensured in mass production only if the position of the damper in relation to the wheel carrier and to the vehicle body during the assembly is predefined exactly and said position is also maintained exactly. The latter is ensured if the damper can be fastened to the wheel carrier or to the vehicle body in the manner according to the invention only in a defined position or location.

This, namely a possibility of fastening only in a defined position, can be provided for mass production in a relatively simple manner by way of a form fit. In this respect, the form-fitting blockage of the rotational degree of freedom of the rubber bearing bushing to be fastened with the screw or the like to the wheel carrier and/or to the vehicle body is realized by an interengagement between said nose and said cutout.

In addition, patent protection is also claimed for the method stated below, in which a damper is mounted in such a way that a stress is built up without loading of the assigned supporting spring in the rubber bearing supporting the damper or in the elastomer element thereof, which stress is reduced substantially automatically by way of the loading of the assigned supporting spring, such that the elastomer element is substantially free of stress with a standard loading and thus in the construction position in relation to the rotational degree of freedom of the rubber bearing that is blocked by way of said screw or the like.

For the sake of simplicity, reference is made below only to fastening according to the invention of a vibration damper to a wheel carrier, without hereby excluding the possibility of analogous damper fastening to the vehicle body.

In a preferred configuration of the invention, it is provided that the nose is of at least approximately cylindrical form. Particularly preferably, the nose constitutes here an oval cylinder, an elliptical cylinder or a parabolic cylinder or a cylindric section thereof. Here, the nose is preferably arranged on the rubber bearing bushing in such a way that the cylinder longitudinal axis is arranged at least approximately parallel to a perpendicular to the screw longitudinal axis.

Here, it is furthermore preferred that the cylindrical nose comprises at least two circular cylinder segments which are arranged one next to the other and are provided with radii of different sizes, wherein the radii of the circular cylinder segments have the same circle center. Particularly preferably, the nose comprises here three circular cylinder segments which adjoin one another one next to the other or adjacently and are provided with radii of different sizes. Here, the surfaces, provided with differing radii (in relation to a common circle center), of the circular cylinder segments preferably form a part of the cylinder lateral surface. During the assembly process, it is preferably provided here that said part of the cylinder lateral surface that is formed by the at least two circular cylinder segments is that surface of the nose which is the first one to come into contact with the cutout of the wheel carrier. The radii of the individual cylinder segments are selected here in such a way that the nose does not jam at the edge of the cutout, but rather that the nose slides or glides or engages into the cutout with an accurate fit through advancement alone.

In a preferred embodiment of the invention, for centered guidance of the rubber bearing bushing into the receiving part of the wheel carrier during the assembly process and for axial fixing or guidance, a guide element is provided at that end of the rubber bearing bushing which, in the installed state of the rubber bearing bushing, faces the wheel carrier. Here, said guide element is in the form of a tubular or annular shoulder which can be inserted into a bore of the receiving part of the wheel carrier such that the rubber bearing bushing is centered axially during the assembly process.

Due to the form fit between the nose and the cutout that occurs during assembly, the external rubber bearing bushing is rotated in relation to the internal rubber bearing bushing. Situated between the two rubber bearing bushings is the rubber element, which then has the desired prestress. The relative rotation of the two bushings is realized here solely through advancement and the stated form fit without the rubber bearing bushing having to be rotated manually (by a tool) relative to the other rubber bearing bushing. The nose on the rubber bearing bushing and the cutout in the wheel carrier are shaped here in such a way that they force the internal rubber bearing bushing to rotate through the desired prestressing angle. The desired magnitude of the prestress of the rubber bearing is then generated by way of the prestressing angle.

In a further preferred embodiment, it is provided that the cutout in the receiving part of the wheel carrier is shaped in such a way that, with the nose fully interengaging with or fully engaged into the cutout, the rubber bearing bushing is rotated in a range between 4° and 7° about the bearing longitudinal axis. Particularly preferably, the rotation and thus the prestressing angle of the rubber bearing or of the elastomer element are in a range between 5° and 6°.

For the purpose of achieving the stated prestress, only one such nose of the rubber bearing bushing and only one matching cutout in the rubber bearing bushing or in the receiving part are necessary. It is alternatively also possible, however, for multiple such noses and associated cutouts to be arranged.

A method for producing a fastening arrangement is furthermore claimed.

Here, in a first step, the rubber bearing bushing or the rubber bearing is positioned in relation to the receiving part of the wheel carrier (and/or the vehicle body) in such a way that the bearing longitudinal axis and the longitudinal axis of the receiving part are arranged so as to be coaxial with one another.

Subsequently, the rubber bearing bushing or the rubber bearing is displaced along the then common axial axis in the direction of the wheel carrier.

In the process, the rubber bearing is displaced into the receiving part of the wheel carrier by way of screwing-in of the screw or the like.

Here, the screw is turned until the form fit between the nose and the cutout is established. Here, the rubber bearing bushing is not rotated manually in order for the nose to be able to be inserted into the cutout. Instead the nose enters the cutout with an accurate fit in that the screw firstly engages into the inner thread of the receiving part and thereby centrally guides the rubber bearing bushing or the guide element. It is preferably provided here that one of the stated preferred circular cylindrical segments comes into contact with the cutout of the receiving part first. Due to the targeted radius of this circular cylinder segment, jamming and thus catching of the nose in the cutout can be avoided and the whole nose slides into the cutout. Due to the targeted shaping of the nose and of the cutout, such as for example by way of the preferred radii of the circular cylinder segments of the nose, the nose slides into the cutout solely through advancement. Manual rotation of the rubber bearing bushing is no longer necessary here.

In a final step, the screw is tightened and the rubber bearing is thus fixed to the wheel carrier and/or to the vehicle body.

It is furthermore preferably provided here that the rubber bearing bushing is produced in a cold-forming or in a hot-forming process. The nose may subsequently be produced by a cutting machining process, in particular by a milling process (for example by contour milling) at the rubber bearing bushing. Alternatively, it is also possible for the whole rubber bearing bushing to be produced by a cutting process.

Here, the cutout in the receiving part of the wheel carrier and/or of the vehicle body is preferably likewise produced by a cutting process, such as for example drilling or milling (for example contour milling).

These and further features emerge not only from the claims and from the description but also from the drawings, wherein the individual features may be realized in each case individually or severally in the form of sub-combinations in an embodiment of the invention and form advantageous embodiments which are worthy of independent protection and for which protection is claimed here.

The invention will be discussed in more detail below on the basis of an exemplary embodiment. Here, all the features described in more detail may be essential to the invention.

DETAILED DESCRIPTION OF THE DRAWINGS

Figure 1:
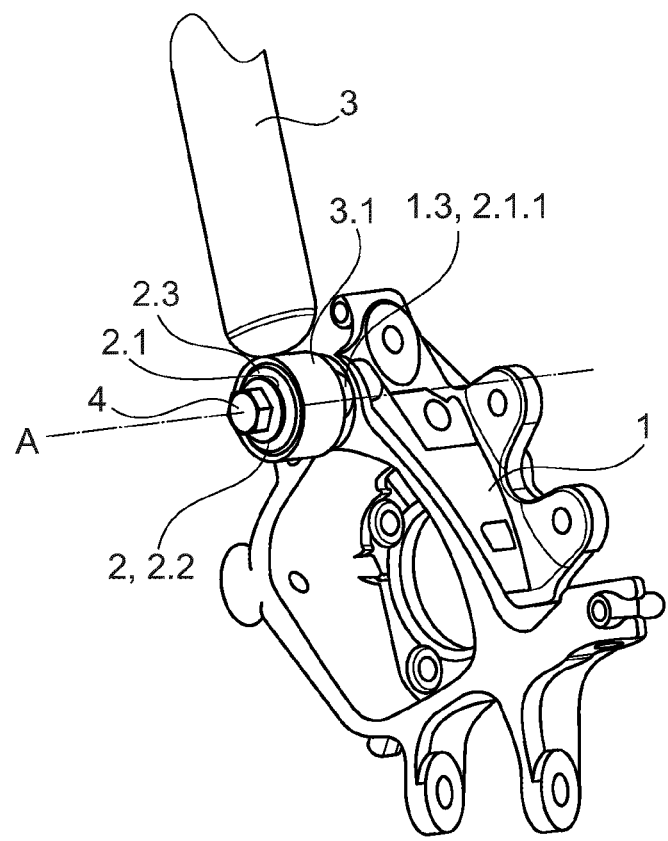
FIG. 1 shows a three-dimensional partial view of a wheel carrier arrangement in accordance with an embodiment of the present invention.

FIG. 1 shows here a three-dimensional partial view of a wheel carrier 1 with an attached rubber bearing 2 which supports a vibration damper 3, of which only the part directly adjacent to the rubber bearing 2 can be seen, or via which the damper 3 is fastened to the wheel carrier 1. Here, it should be pointed out again that, instead of the wheel carrier 1, a suitable section of the vehicle body to which the damper 3 is fastened via a rubber bearing 2 in a corresponding manner according to the invention is also possible. Otherwise, self-evidently, that end of the vibration damper 3 which is situated opposite the wheel carrier 1 is also fastened to the vehicle body in the case of the exemplary embodiment mentioned, albeit in a conventional manner there, wherein the damper 3 is preferably a constituent part of a damper/supporting spring unit, which furthermore has a supporting spring (not shown) and is supported in its entirety in a so-called support bearing on the vehicle body.

Figure 2:
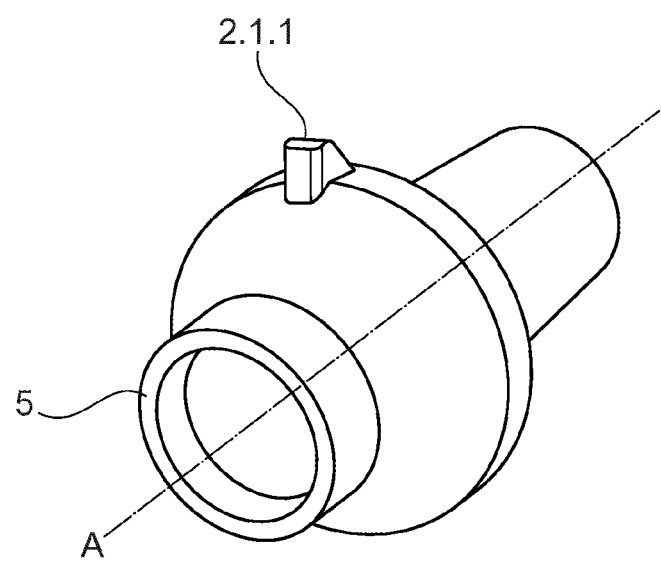
FIG. 2 shows a three-dimensional detail view of the inner bushing of FIG. 1.

FIG. 2 shows here a three-dimensional detail view of the inner bushing 2.1 of the rubber bearing 2, which inner bushing is connected to the wheel carrier 1.

Figure 3:
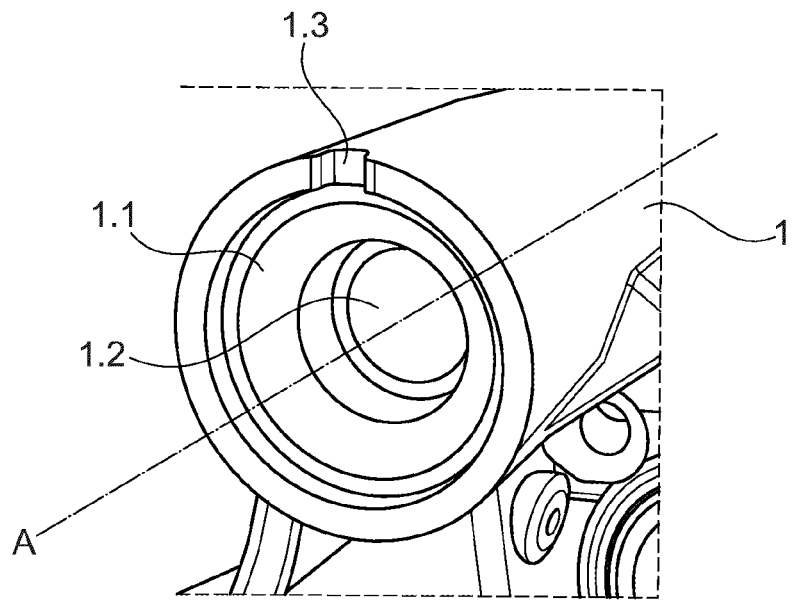
FIG. 3 shows a three-dimensional detail view of the receiving part of the wheel carrier of FIG. 1.

FIG. 3 shows a three-dimensional detail view of the receiving part 1.1 of the wheel carrier 1, to which receiving part the rubber bearing inner bushing 2.1 is connected.

Figure 4:
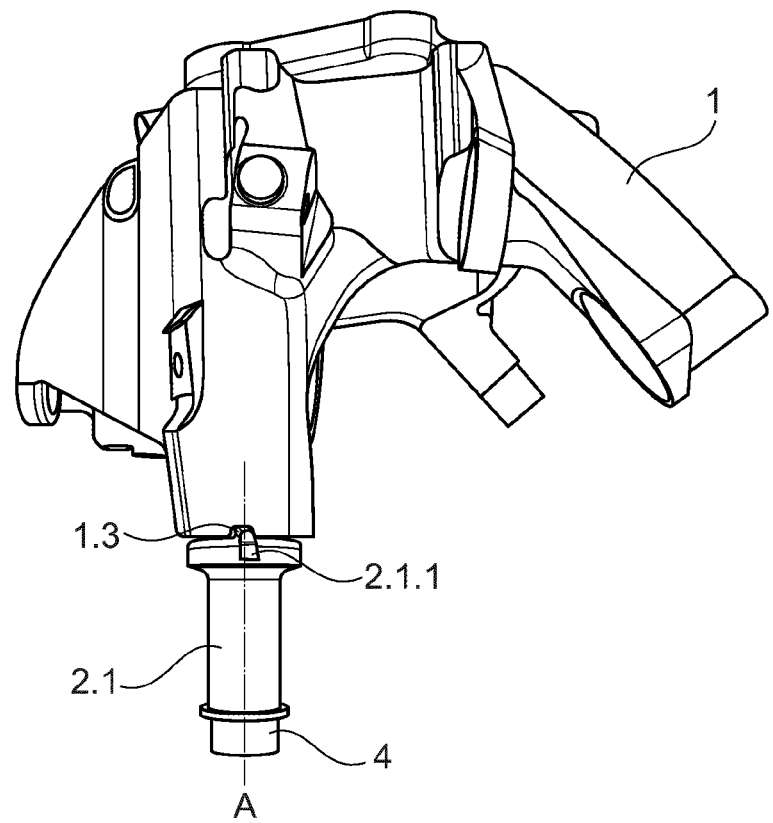
FIG. 4 shows the wheel carrier of FIG. 1 in a three-dimensional plan view.

FIG. 4 shows the wheel carrier 1 in a three-dimensional plan view, wherein the rubber bearing inner bushing 2.1 is illustrated in the initial position of the assembly process.

Figure 5:
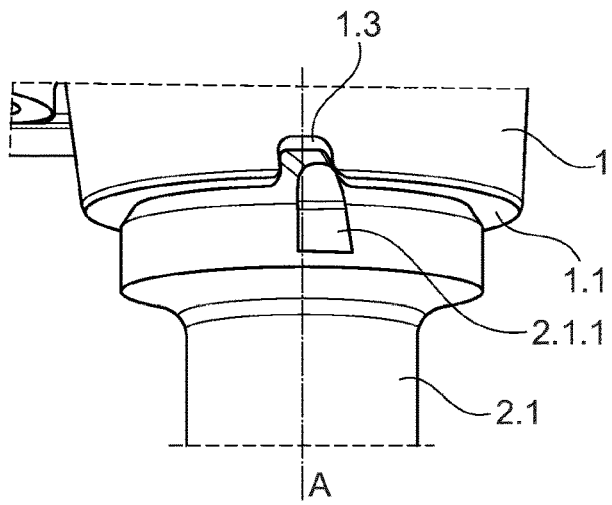
FIGS. 5 to 7 show in plan view a connection process in accordance with an embodiment of the present invention.
Figure 6:
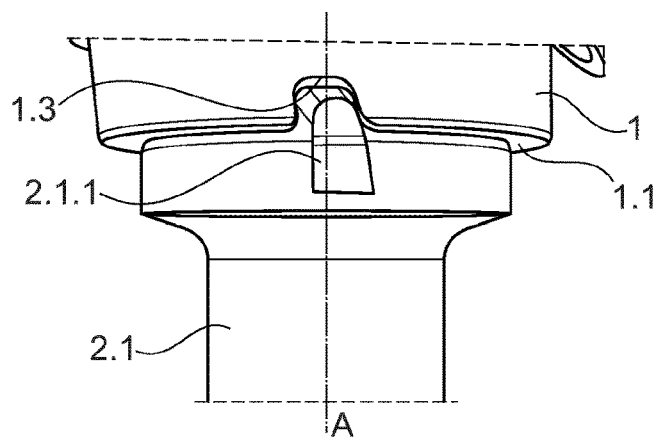
Figure 7:
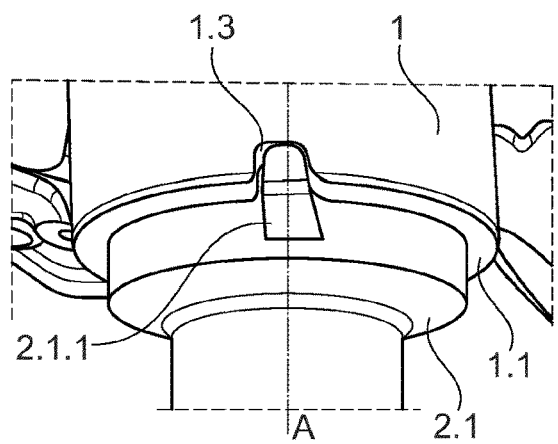

FIGS. 5 to 7 show here, in each case in a plan view, the connection process during assembly between the nose 2.1.1 of the rubber bearing inner bushing 2.1 and the cutout 1.3 in the receiving part 1.1 of the wheel carrier 1.

Referring first of all to FIG. 1, a rubber bearing 2 on whose outer bushing 2.2 a vibration damper 3 is supported by way of its bearing lug 3.1 and whose inner bushing 2.1 is fastened by means of a screw 4 to the wheel carrier 1, that is to say is screwed thereto or braced with respect thereto, can be seen. As is customary, a cross-sectionally annular elastomer element 2.3 is situated between the two bushings 2.1, 2.2. The inner bushing 2.1, which interacts functionally with the screw 4, bears with its end section facing the wheel carrier 1 on the correspondingly designed bearing region or on a receiving part 1.1 of the wheel carrier 1. Here, provision is made at the inner bushing 2.1 and at the wheel carrier 1 of a measure by way of which the rotational degree of freedom of said inner bushing 2.1 about the axis A (longitudinal axis, axis of rotation) of the screw 4 is blocked by a form-fitting blockage. Said form-fitting blockage is, as can be seen in the following figures (not visible in FIG. 1), realized by an interengagement of a nose 2.1.1 arranged on the inner bushing 2.1 with a cutout 1.3 arranged in the receiving part 1.1 of the wheel carrier 1.

Such a nose 2.1.1 can be seen in FIG. 2 in a detail view of the inner bushing 2.1 of the rubber bearing 2. FIG. 2 shows here that end of the inner bushing 2.1 which, in the installed state, is connected to the receiving part 1.1 of the wheel carrier 1. Here, the nose 2.1.1 is arranged so as to project from an outer surface of this end or end section of the inner bushing 2.1. Here, the nose 2.1.1 is produced in a milling process and has (asymmetrically) an (at least approximately) cylindrical shape. In this specific example, the inner bushing 2.1 comprises only one nose 2.1.1. However, it is equally possible for more than only one nose 2.1.1 to be arranged on the inner bushing and thus to realize multiple form fits during the assembly process. The inner bushing 2.1 furthermore comprises, likewise at the end facing the wheel carrier (as viewed in the installed state), a hollow-cylindrical guide element 5 which, during assembly or during the connection of the damper lug to the wheel carrier, is pushed into a bore 1.2, provided therefor, in the receiving part 1.1 of the wheel carrier 1.

FIG. 3 shows a detail view of the receiving part 1.1 of the wheel carrier 1 for the end section of the inner bushing 2.1 of the rubber bearing 2. The wheel carrier 1 furthermore comprises, in the interior of the receiving part 1.1, a bore 1.2 into which the hollow-cylindrical guide element 5 of the inner bushing 2.1 is inserted during assembly and thus makes it possible for the inner bushing 2.1 to be guided axially (in the direction of the axis of rotation A of the rubber bearing 2 or of the screw 4) in the wheel carrier 1.

The receiving part 1.1 further comprises the stated cutout 1.3 for engagement of the nose 2.1.1 during the connection process.

FIG. 4 shows a view from above of the wheel carrier 1 and of the inner bushing 2.1 of the rubber bearing 2 with the already inserted screw 4 (in the installation position in the vehicle for the assembly process). Here, said view describes the position of the inner bushing 2.1 in relation to the wheel carrier 1 before the joining process or connection process. At this moment during the assembly (also referred to as initial position), the nose 2.1.1 is not yet in contact with the cutout 1.3. The stated guide element 5, by contrast, has already been inserted into the bore 1.2 of the receiving part 1.1 and the screw 4 already engages on the inner thread of the receiving part 1.1.

If the inner bushing 2.1 is displaced axially further in the direction of the wheel carrier 1, then, as can be seen in FIG. 5, the nose 2.1.1 comes into contact with the cutout 1.3. Here, FIG. 5, FIG. 6 and FIG. 7 show respective detail views of the nose 2.1.1 and the cutout 1.3 from above. Further screwing-in of the screw 4 results in the nose 2.1.1 sliding more and more into the cutout 1.3, as can be seen in FIG. 6. FIG. 7 shows the final position of the nose 2.1.1 in the cutout 1.3 with the screw 4 screwed tight.

In order to realize the form fit of the nose 2.1.1 with the cutout 1.3, only the advancement or the axial displacement of the inner bushing 2.1 in the direction of the axis of rotation A is necessary. A specific ratio of the angles of the cutout 1.3 to the angles of the surfaces of the nose 2.1.1 that are pushed into said cutout 1.3 makes it possible for jamming of the nose 2.1.1 at the cutout 1.3 to be advantageously avoided. Also, it is then possible for the form fit to be realized without manual rotation of the inner bushing 2.1. Here, the nose 2.1.1 is shaped in such a way that it engages or slides into the cutout 1.3 solely through advancement (in the direction of the axis of rotation A of the screw 4).

By way of the precisely selected position of the damper 3 and thus of the inner bushing 2.1 in relation to the wheel bearing 1 for the assembly, it is possible to generate the aforementioned prestress without loading of the associated supporting spring in the elastomer element 2.3. It is thus possible to connect the inner bushing 2.1 to the wheel carrier 1 only when the inner bushing 2.1 is rotated by the amount predefined by the form fit and the elastomer element 2.3 is in this way prestressed.

In particular in FIGS. 5 to 7, the parabolic cross section of the cylindrical nose 2.1.1 is shown here. It is particularly preferably provided here that that surface which (as can be seen in FIG. 5 and FIG. 6) is first in contact with the edge of the cutout 1.3 during the joining process comprises multiple differing radii which adjoin one another. Said radii are matched here to the edge of the cutout 1.3 in such a way that the nose 2.1.1 moves into or enters the cutout 1.3 through advancement alone.

LIST OF REFERENCE SIGNS

1 Wheel carrier
1.1 Receiving part
1.2 Bore
1.3 Cutout
2 Rubber bearing
2.1 Inner bushing of the rubber bearing
2.1.1 Nose
2.2 Outer bushing of the rubber bearing
2.3 Elastomer element
3 Vibration damper
4 Screw
5 Guide element
A Axis of rotation

What is claimed is:

1. A fastening arrangement for fastening a vibration damper of a vehicle to at least one of a wheel carrier and a body of the vehicle, comprising:
   a rubber bearing; and
   a fastener configured to secure the rubber bearing to the at least one of the wheel carrier and the vehicle body, wherein
   the rubber bearing includes at least two rubber bushings,
   when the fastener is in an installed state one of the at least two bushings is fixed in three orthogonal degrees of freedom in relation to the at least one of the wheel carrier and the vehicle body, when the fastener is in an installed state a rotational degree of freedom of the one of the at least two bushings about a longitudinal axis of the fastener is blocked by a form-fitting blockage, the form-fitting blockage is formed by engagement of a cutout arranged in a receiving part of the at least one of the wheel carrier and the vehicle body configured to receive the rubber bearing with a nose arranged on and projecting from the one of the at least two bushings, and the nose and the cutout are mutually shaped, wherein the form fit between the nose and the cutout is formed during installation of the fastener into the receiving part without rotating the one of the at least two bushings manually using a tool, an engaging portion of the nose is of cylindrical form such that a longitudinal axis of the cylindrical form is arranged parallel to a perpendicular of the longitudinal axis of the fastener, and a cylindrical lateral surface of the engaging portion of the nose engages into the cutout solely through advancement in the direction of the axis of rotation of the fastener.

2. The fastening arrangement according to claim 1, wherein the engaging portion of the nose includes at least two circular cylinder segments having different radii arranged one next to the other, and the radii of the circular cylinder segments have the same circle center.

3. The fastening arrangement according to claim 1, wherein in an installed state of the rubber bearing, an end of one of the at least two bushings facing the at least one of the wheel carrier and the vehicle body includes a guide element configured for centered guidance of the bushing end into the receiving part of the at least one of the wheel carrier and the vehicle body.

4. The fastening arrangement according to claim 1, wherein the cutout is shaped such that, when the nose is fully engaged into the cutout, the one of the at least two bushings is rotated in a range from 4 degrees to 7 degrees about the rubber bearing longitudinal axis relative to a position of the one of the at least two bushings when the one of the at least two bushings is in a construction position in relation to the vehicle body.

5. A method for producing a fastening arrangement for a vibration damper of a vehicle to at least one of a wheel carrier and a body of the vehicle, the fastening arrangement including a rubber bearing and a fastener configured to secure the rubber bearing to the at least one of the wheel carrier and the vehicle body, wherein the rubber bearing includes at least two rubber bushings, when the fastener is in an installed state one of the at least two bushings is fixed in three orthogonal degrees of freedom in relation to the at least one of the wheel carrier and the vehicle body, when the fastener is in an installed state a rotational degree of freedom of the one of the at least two bushings about a longitudinal axis of the fastener is blocked by a form-fitting blockage, the form-fitting blockage is formed by engagement of a cutout arranged in a receiving part of the at least one of the wheel carrier and the vehicle body configured to receive the rubber bearing with a nose arranged on and projecting from the one of the at least two bushings, and the nose and the cutout are mutually shaped, wherein the form fit between the nose and the cutout is formed only by installation of the fastener into the receiving part and an engaging portion of the nose is of cylindrical form such that a longitudinal axis of the cylindrical form is arranged parallel to a perpendicular of the longitudinal axis of the fastener, comprising the acts of:

positioning the one of the at least two bushings in relation to the at least one of the wheel carrier and the vehicle body such that a rubber bearing longitudinal axis and a longitudinal axis of the receiving part are coaxial, displacing the one of the at least two bushings along the common longitudinal axis in a direction of at least one of the wheel carrier and the vehicle body, initiating installation of the fastener without rotating one of the at least two bushings manually using a tool until the form fit between the nose and the cutout is established, such that a cylindrical lateral surface of the engaging portion of the nose engages into the cutout solely through advancement in the direction of the axis of rotation of the fastener, and fixing the rubber bearing to at least one of the wheel carrier and the vehicle body by completing the installation of the fastener.

6. The method according to claim 5, wherein the engaging portion of the nose includes at least two circular cylinder segments having different radii arranged one next to the other, the radii of the circular cylinder segments have the same circle center, and one of the circular cylinder segments of the nose is the first circular cylinder segment to come into contact with the cutout.

7. The method according to claim 5, wherein the one of the at least two bushings is produced in a cold-forming or in a hot-forming process, and the nose is subsequently produced by a cutting machining process applied to the cold-formed or hot-formed one of the at least two bushings.

8. The method according to one of the preceding claim 5, wherein the cutout is produced by a cutting machining process.

* * * * *